United States Patent [19]

Tang et al.

[11] Patent Number: 4,485,473
[45] Date of Patent: Nov. 27, 1984

[54] MODE LOCKING OF TRAVELLING WAVE RING LASER BY AMPLITUDE MODULATION

[75] Inventors: Chung L. Tang; Nils A. Olsson; Jean-Marc Halbout, all of Ithaca, N.Y.

[73] Assignee: Cornell Research Foundation, Inc., Ithaca, N.Y.

[21] Appl. No.: 373,078

[22] Filed: Apr. 29, 1982

[51] Int. Cl.³ .............................................. H01S 3/083
[52] U.S. Cl. ..................................... 372/18; 356/350; 372/12; 372/20; 372/94
[58] Field of Search ....................... 372/12, 18, 20, 26, 372/25, 54, 94; 356/350

[56] References Cited

U.S. PATENT DOCUMENTS

| | | | |
|---|---|---|---|
| 2,973,219 | 8/1976 | Tang et al. | 331/94.5 |
| 3,412,251 | 11/1968 | Hargrove | 250/199 |
| 3,456,210 | 7/1969 | Statz et al. | 331/94.5 |
| 3,541,471 | 11/1970 | Kaminow et al. | 331/94.5 |
| 3,559,102 | 1/1971 | Ueki | 332/7.51 |
| 3,611,187 | 10/1971 | Osterink | 331/94.5 |
| 3,648,193 | 3/1972 | Foster et al. | 331/94.5 |
| 3,651,424 | 3/1972 | Ueno et al. | 331/94.5 |
| 3,757,247 | 9/1973 | Giallorenzi et al. | 331/94.5 |
| 3,766,393 | 10/1973 | Herzog et al. | 250/199 |
| 3,983,507 | 9/1976 | Tang et al. | 331/94.5 M |
| 3,988,704 | 10/1976 | Rice et al. | 332/7.51 |
| 4,019,156 | 4/1977 | Fountain et al. | 331/94.5 ML |
| 4,104,598 | 8/1978 | Abrams | 331/94.5 M |
| 4,229,079 | 10/1980 | Wayne et al. | 350/356 |
| 4,250,466 | 2/1981 | Jernigan et al. | 331/94.5 M |

OTHER PUBLICATIONS

C. K. Chan and S. O.Sari, "Tunable Dye Laser Pulse Converter for Production of Subpicosecond Pulses", Appl. Phys. Lett., vol. 25, 403–406 (1974).
D. M. Henderson and V. A. Vilrotter, "Optical Coupling Modulation in Traveling Wave Cavities", Appl. Phys. Lett., vol. 30, 335–337 (1977).
S. Blit and C. L. Tang, "Mode Locking of Travelling-Wave CW Ring Dye Laser", Appl. Phys. Lett. 36(1), 16–18 (1980).
K. Washio, T. Yamane, S. Yoshikawa, K. Koizumi and Y. Ikeda, "A Frequency-Tunable Mode-Locked CW Nd: Glass Laser", IEEE Jour., vol. 9, 807–813 (1973).
R. Owen, "Laser Gyroscope", Popular Science 34 (1981).
C. V. Shank and E. P. Ippen, "Subpicosecond Kilowatt Pulses from a Mode-Locked CW Dye Laser", Appl. Phys. Lett. 24, 373–375 (1974).
E. P. Ippen and C. V. Shank, "Dynamic Spectroscopy and Subpicosecond Pulse Compression", Appl. Phys. Lett 27, 488–489 (1975).
E. P. Ippen, C. V. Shank and A. Dienes, "Passive Mode-Locking of the CW Dye Laser", Appl. Phys. Lett. 21, 348–350 (1972).
G. Mitchell and W. Proffit, "Subpicosecond Pulses from a Synchronously Mode-Locked, Travelling-Wave, Ring Dye Laser", paper WL-2 at CLEO '81.
J. P. Heritage and E. D. Isaacs, "Subicosecond Pulse Generation in a Synchronously Mode-Locked Bidirectional Ring Laser", paper WL-3 at CLEO '81.
R. L. Fork, B. I. Green and C. V. Shank, "Generation of Optical Pulses Shorter than 0.1 psec by Colliding Pulse Mode Locking", Appl. Phys. Lett. 38, 671–672 (1981).

*Primary Examiner*—James W. Davie
*Attorney, Agent, or Firm*—Jones, Tullar & Cooper

[57] ABSTRACT

An amplitude modulator for a tunable ring cavity dye laser is disclosed. The modulator is operated in time synchronization with the laser pump and is located assymetrically within the ring to attenuate dye laser pulses in one direction while passing pulses in the opposite direction, thereby producing a mode locked unidirectional travelling wave. The use of a low dispersion electro-optical modulator in a dye laser yields subpicosecond optical pulses with wide tunability.

15 Claims, 5 Drawing Figures

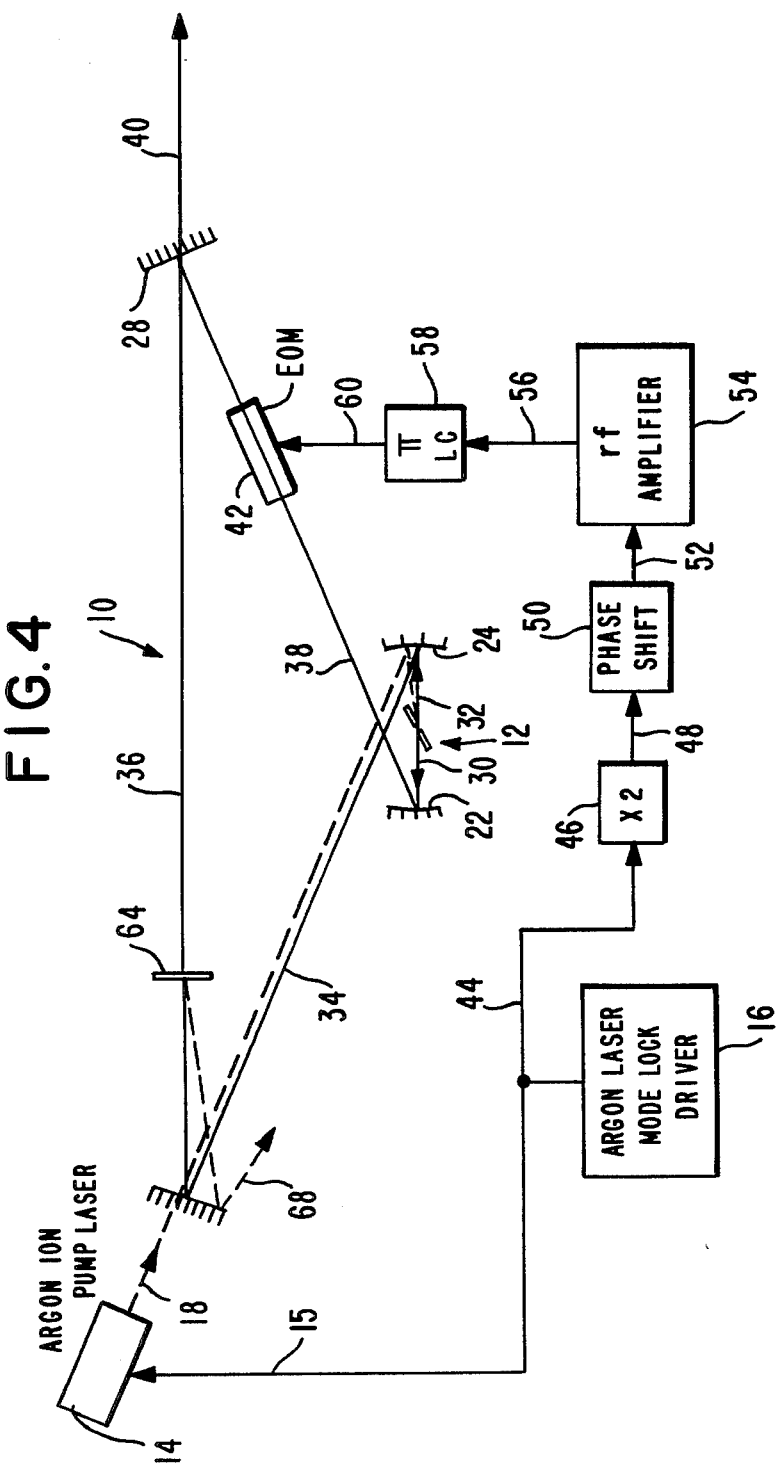

MODE LOCKING OF TRAVELLING WAVE RING LASER BY AMPLITUDE MODULATION

BACKGROUND OF THE INVENTION

The U.S. Government has rights in this invention pursuant to Grant No. ENG 7809887, awarded by the National Science Foundation.

The present invention relates, in general, to a method and apparatus for producing extremely short optical pulses, and more particularly to a method and apparatus for achieving travelling-wave operation in synchronously mode-locked ring lasers whereby tunable subpicosecond optical pulses are attained.

It is known that some liquids, which are usually organic dyes can be made to lase, and the use of liquids as the active medium of a laser is attractive since liquids can be of high optical quality, and cooling problems can be overcome by circulating the liquid. Furthermore, liquid lasers can be tuned easily over a wide range of frequencies by a variety of methods. One of the most successful dye lasers incorporates Rhodamine 6G (Rh-6G), which provides a relatively high energy output and efficiency.

Liquid dye lasers can be tuned to change the wavelength of the laser output by varying any of several parameters, including changing the Q of the cavity, changing the solvent, changing the optical path length in the cavity, and changing the pump energy. U.S. Pat. No. 3,983,507 discloses a tunable folded cavity dye laser which incorporates a birefringent tuning crystal of suitable eletro-optical material within the cavity. The crystal may be mechanically adjusted with respect to the optical axis of the cavity to tune the laser, or may have a variable voltage applied thereto to electrically vary the optical path for tuning the laser.

Although dye lasers as described in U.S. Pat. No. 3,583,507 provide a reliable source for tunable pulses, extremely short, subpicosecond pulses have most easily been obtained from continuous wave passively mode-locked lasers of the type described by C. V. Shank and E. P. Ippen in "Subpicosecond Kilowatt Pulses from a Mode-Locked CW Dye Laser", Appl. Phys. Lett. 24, 373-375 (1974) and by E. P. Ippen and C. V. Shank in "Dynamic Spectroscopy and Subpicosecond Pulse Compression", Appl. Phys. Lett. 27, 488-489 (1975). However, such lasers are somewhat limited in their tuning range, as pointed out by E. P. Ippen, C. V. Shank and A. Dienes in "Passive Mode-Locking of the CW Dye Laser", Appl. Phys. Lett. 21, 348-350 (1972).

Recently, considerable interest has been expressed in the use of ring-type cavities for mode-locked dye lasers instead of the standard three-mirror folded cavity illustrated in U.S. Pat. No. 3,983,507. See, for example, S. Blit and C. L. Tang, "Mode-Locking of Travelling-Wave CW Ring Dye Laser", Appl. Phys. Lett. 36, 16-18 (1980); G. Mitchell and W. Proffit, "Subpicosecond Pulses from a Synchronously Mode-Locked, Travelling-Wave, Ring Dye Laser", paper WL-2 at CLEO '81; J. P. Heritage and E. D. Isaacs, "Subpicosecond Pulse Generation in a Synchronously Mode-Locked Bidirectional Ring Laser", paper WL-3 at CLEO '81; and R. L. Fork, B. I. Green and C. V. Shank, "Generation of Optical Pulses Shorter than 0.1 psec by Colliding Pulse Mode Locking", Appl. Phys. Lett. 38, 671-672 (1981). As noted in the Blit et al and Mitchell et al publications, stable trains of ultrashort pulses have been obtained from synchronously pumped travelling wave ring lasers, but these devices did not produce pulses significantly shorter than the shortest pulses reported for standing wave lasers, probably because the unidirectional travelling wave operation was achieved in such devices by means of intracavity optical components that were lossy and dispersive.

In a dye laser with, for example, a conventional three-mirror folded cavity, the actively pumped dye solution can support two intracavity laser pulses travelling in opposite directions. After round trips in the cavity, these two pulses will always meet again at the active medium and be amplified when the successive pump pulses arrive. However, these two pulses will generally arrive at the output mirror at different times, leading to the appearance of satellite pulses in the laser output, and poor locking. To achieve good locking in such a linear laser, one of these intracavity pulses has to be completely eliminated. In theory, once one of the two possible pulses has started, stimulated emission will favor this pulse and prevent the other from building up, and this theory is often used to explain why good locking can be achieved in linear lasers at all. In practice, however, because of unavoidable, relatively large fluctuations in the laser medium, cavity alignment, pumping intensity, etc., this mechanism alone cannot eliminate completely one of the two pulses, and cannot lead to good locking.

Accordingly, mode-locking schemes have, in the past, generally relied on controlled increases in discrimination, or asymetry, of the gain (or loss) for the two opposed pulses in a ring laser. Because each pulse is uniquely associated with a direction of travel at all times, such controlled discrimination can be achieved by inserting a nonreciprocal element, such as a Faraday rotator, in the cavity. The use of such rotators has produced unidirectional operation in a ring laser, resulting in a single mode-locked travelling wave pulse train, as pointed out in the Blit et al article listed above. However, because the unidirectional operation is achieved in such devices by the use of a lossy and dispersive intracavity component, the resulting output pulses are not significantly shorter than the shortest pulses reported for standing wave lasers.

A Faraday rotator with a high enough Verdet constant for operation with a reasonable magnetic field when used as an intracavity isolator will be intrinsically lossy and dispersive in the spectral region of interest, even though unidirectional operation can be achieved with only a few percent differential loss between the two counter-propagating waves. Internal losses of three percent per centimeter at a wavelength of 500 nm indicates that a substantial dispersion is expected in the spectral region covered by the output from an Rh-6G dye laser. The pulse width of the output obtainable is inherently limited by these factors. In addition, a Faraday isolator requires the insertion in the cavity of a birefringent bias half-wave plate which complicates the tuning of the laser.

SUMMARY OF THE INVENTION

It is an object of the present invention to provide a travelling wave ring laser which produces extremely short, tunable optical pulses.

Another object of the invention is to provide an easily tunable ring laser having a narrow optical pulse output.

The foregoing objects are achieved, in accordance with the present invention, through the provision, in a synchronously pumped, mode-locked laser, of a single intracavity synchronously driven amplitude modulator which acts both as a tuning element and as a dynamic unidirectional element. The modulator is nondispersive and has low loss to permit the generation of widely tunable optical pulses having a pulse width as short as 350 femtoseconds (fs). In a specific embodiment of the invention, the modulator was a deuterated potassium dihydrogen phosphate (KDP) longitudinal electrooptic amplitude modulator, which had a total loss of less than 0.1% at a wavelength of 600 nm, and which showed virtually no dispersion in the tuning range of the dye laser.

Briefly, in one embodiment of the invention a ring dye laser of conventional configuration is provided. The laser is pumped by an Argon ion laser, which is driven by a highly stable oscillator. An electrooptic modulator is mounted in the ring cavity at a point which is approximately one-fourth the total cavity length from the dye jet stream. The modulator is driven by the oscillator through a frequency doubler, a phase adjustment delay line, an r.f. amplifier, and a resonant circuit so that by adjustment of the phase delay line, its operation is synchronized with the pumping action of the Argon laser. By proper selection of the relative phase of the r.f. signals supplied to the modulator and those fed to the Argon laser, a large differential loss for the mode-locked pulses travelling in opposite directions in the ring cavity can be achieved. Thus, time synchronization of the modulator with the pumping input produces a mode locked travelling wave which produces an extremely short pulse easily tunable to different frequencies of operation.

BRIEF DESCRIPTION OF THE DRAWINGS

The foregoing, and additional objects, features, and advantages of the present invention will be more clearly understood from a more detailed consideration of the invention as set forth in the following description of a preferred embodiment thereof, taken with the accompanying drawings, in which:

FIG. 4 is a diagrammatic illustration of a modified form of the dye laser of FIG. 1.

DESCRIPTION OF PREFERRED EMBODIMENTS

Figure 1:
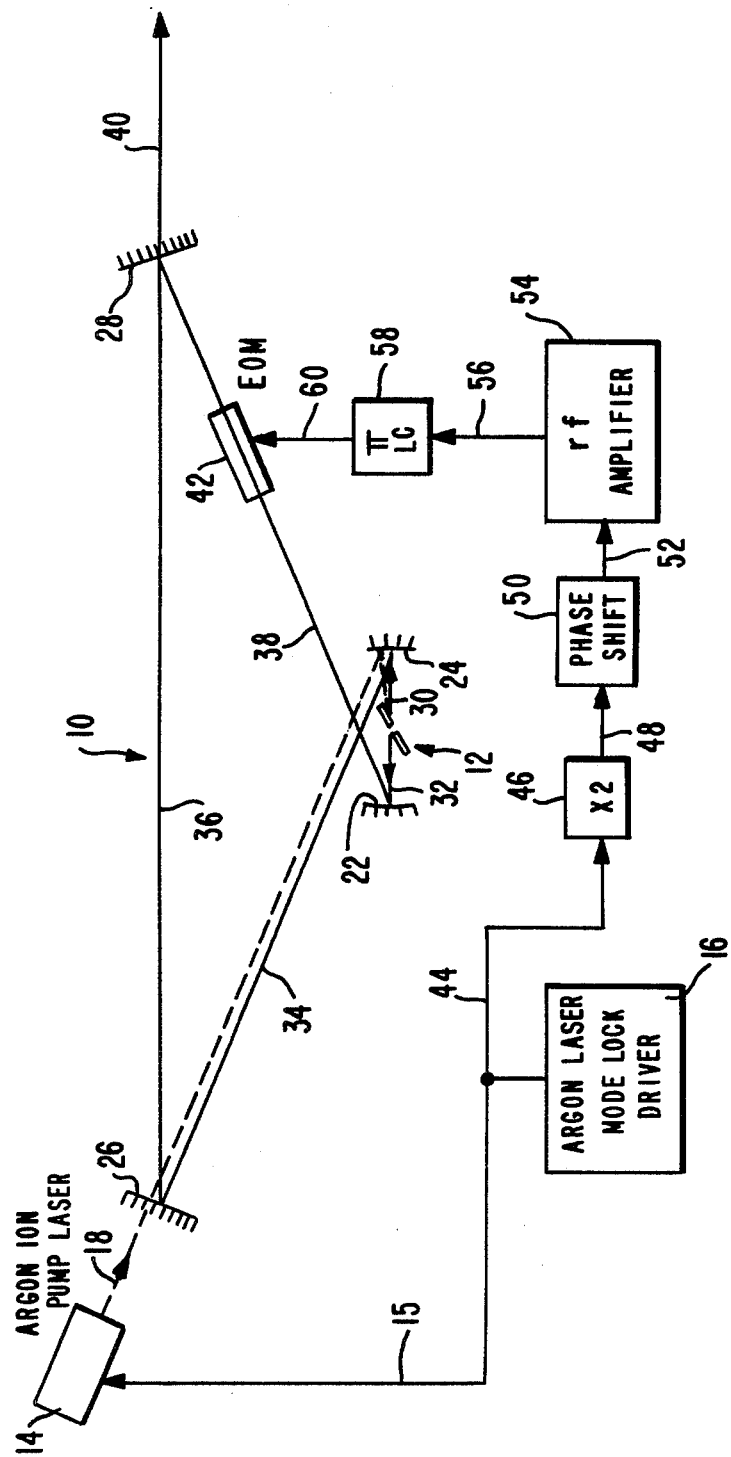
FIG. 1 is a diagrammatic illustration of a dye laser ring cavity having an electro-optic modulator mounted in the ring cavity, in accordance with the present invention.

Turning now to a more detailed consideration of the present invention, there is illustrated in FIG. 1 a laser ring cavity 10 which may, in a preferred form of the invention, be a dye laser incorporating a dye jet 12 which is pumped by an Argon ion laser 14, which may, for example, be a Spectra-Physics Model 171 laser. The pumping laser 14 is mode locked by an acousto-optic modulator (not shown) driven in known manner through line 15 by a highly stable mode lock driver 16, which may be an HP 8640 B oscillator, and which exhibits very low phase noise.

Figure 2:
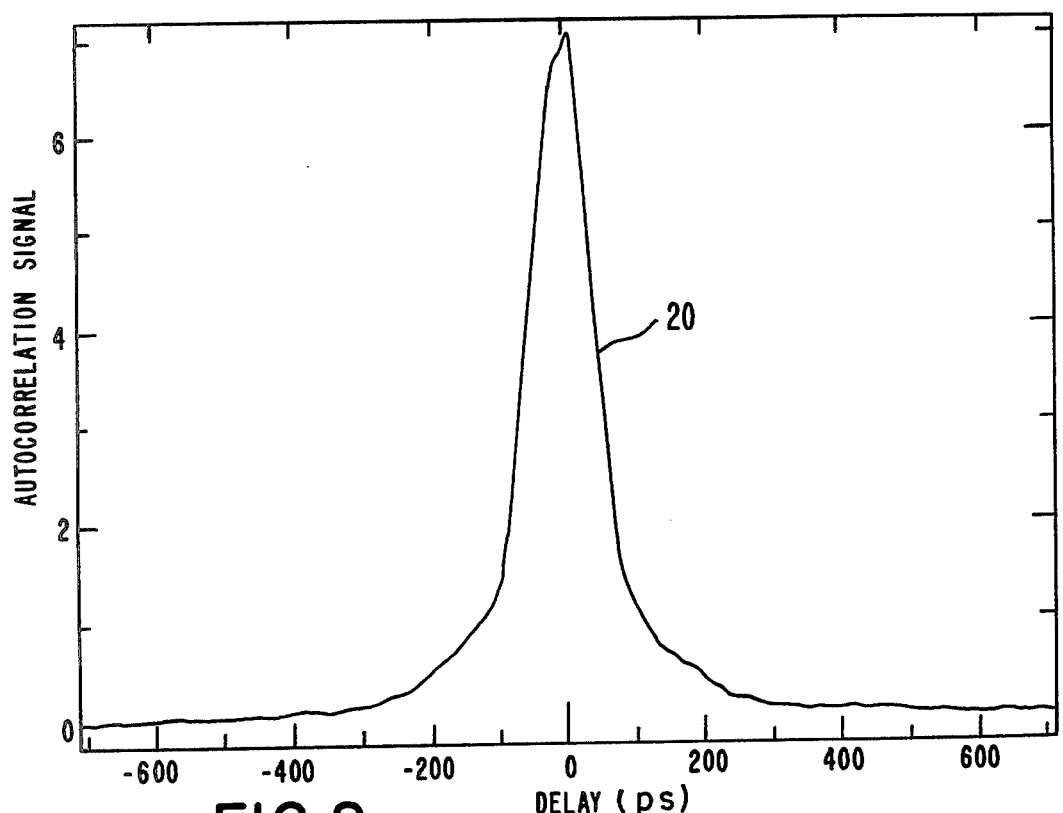
FIG. 2 is a typical autocorrelation trace for the Argon laser used to pump the dye laser of FIG. 1.

The Argon laser 14 produces a train of optical pulses 18 which are directed into the ring cavity 10 to pump the dye jet 12, in known manner. The optical pulse width of a typical laser 14 has been measured by CW background free autocorrelation in an angle tuned Urea crystal, and a typical autocorrelation trace 20 is illustrated in FIG. 2. As shown, for a laser producing 600 milliwatts (mW) of output power, the trace displays a full width half maximum (FWHM) of 103 picoseconds (ps), leading to an optical pulse duration of 73 ps, assuming a Gaussian pulse shape. At output powers higher than 1 watt, considerable broadening of the pulse width is observed, and satellite pulses are sometimes produced.

The laser ring cavity 10 comprises the dye jet 12 and conventionally arranged mirrors 22, 24, 26, and 28 which define the optical path of the light emitted by the jet 12. The dye jet is pumped by the externally located Argon laser 14 through the input mirror 26, as indicated by the dotted line 18, causing the dye material to lase and produce two intracavity laser pulses travelling in opposite directions, indicated by the solid lines 30 and 32. These two pulses will travel within the cavity along the paths indicated by lines 34, 36, 38, and 38, 36, and 34 respectively. After round trips in the cavity, the two pulses will meet again at the active medium of the dye jet 12, and will be amplified upon the simultaneous arrival of the successive synchronous pump pulse.

Pulse 32 travels along the path 38, 36, 34 from mirror 22 to mirrors 28, 26, and 24, back to the dye jet 12, while pulse 30 travels along the path 34, 36, and 38, which includes mirrors 24, 26, 28, and 22. The two pulses arrive at the output mirror 28 at different times, leading to poor mode locking. To achieve good mode locking in such a laser, one of the two counterpropagating intracavity pulses should be suppressed and this is accomplished by means of an electrooptic modulator (EOM) 42, located in the intracavity optical path. Preferably the EOM is located a distance of about one quarter of the total cavity length away from the jet stream 12 so that maximum discrimination is obtained between the two counterpropagating pulses leaving the dye jet when the modulation is sinusoidal. The EOM consists of a deuterated KDP longitudinal electrooptic crystal which may be voltage controlled to act as an amplitude modulator. Such a crystal is birefringent, has an internal loss of less than 0.1% at a wavelength of 600 nm, and has virtually no dispersion in the tuning range of the dye laser. The EOM 42 is aligned with the optical path within the cavity by observing the conoscopic patterns from the divergent beam of an He-Ne laser injected collinearly into the cavity through the output coupler 28. This alignment procedure facilitates the orientation of the electrooptic modulator crystal optic axis with respect to the dye laser beam path, so that the desired birefringent effects can be obtained. This permits the desired oscillating bandwidth to be obtained for the dye laser.

The modulator crystal 42 is controlled by means of a modulating voltage which is applied to two ring electrodes at the two ends of the crystal rod. The modulating voltage is derived from the mode lock driver 16, the output of which may be a 41 MHz reference signal, the actual frequency to be used depending upon the Ar laser cavity length. The output from driver 16 is fed by way of line 44 to a frequency doubler 46, which provides an 82 MHz reference signal on line 48. This signal is phase adjusted in a delay line 50, and is fed by way of line 52, a medium power r.f. amplifier 54, line 56, π-LC resonant circuit 58, and line 60 to drive the EOM 42. The resonant circuit has a Q factor which is adjustable around 50 to deliver the necessary voltage to the electrooptic crystal 42.

The Argon laser pumping pulses are delivered at a repetition rate of 82 MHz, and adjustment of the phase shift delay line 50 permits the phase of the r.f. signals applied to the modulator 42, relative to the phase of the pumping pulses, to be so selected that there is a large differential loss for the mode-locked pulses travelling in opposite directions in the ring cavity.

The application of a selected control voltage to the electrodes on the electrooptic crystal changes the birefringence of the crystal, thereby changing the loss of laser light propagating in the cavity. By synchronizing the application of this control voltage with the operation of the pumping laser 14, the optical pulse in one direction will encounter maximum optical transmittance in the crystal, while the optical pulse travelling in the opposite direction will reach the EOM at a time of minimum optical transmittance. The two pulses thus encounter different losses in the optical path, and this differential effect results in suppression of the pulse travelling in the direction of minimum transmittance, thereby producing unidirectional travelling wave operation.

The birefringent electrooptic modulator crystal 42 also has the characteristic of providing different losses at different wavelengths. If N represents the difference in integral numbers of optical wavelengths between the two waves polarized along the two principal axes of the crystal 42, then best results are obtained in the present invention for alignments of the EOM crystal where N is equal to 3 or 4. For a beam, or pulse, propagating along the optic axis of the crystal, $N=0$, and the electrooptic crystal 42 acts simply as an amplitude modulator to the counterpropagating pulses upon the application of a control voltage. However, if the EOM crystal 42 is aligned with the dye laser pulse path, so that N does not equal zero, then the combined action of the EOM and the conventional Brewster surfaces of the dye jet cooperate to act as a frequency modulator to tune the cavity to a desired wavelength. In the latter case, amplitude modulation is also achieved through the wavelength dependence of the EOM crystal 42.

Although unidirectional operation is most easily obtained at low values of N, where the greatest differential amplitude modulation between the two directions occurs, it has been found that such a configuration allows too wide an oscillation bandwidth over which full mode locking cannot be achieved. However, unidirectional travelling wave operation has been easily obtained for values of N up to 11, by proper adjustment of the phase of the waveform driving the electrooptic modulator.

The optical pulse width produced by the ring laser 10 may be measured by the standard technique of collinear/nonlinear mixing in a 2 mm ammonium dihydrogen phosphate (ADP) crystal. The spectrum of the dye laser pulses can be monitored by a vidicon array placed behind a quarter-meter monochromator, giving a resolution of about one Angstrom.

Figure 3:
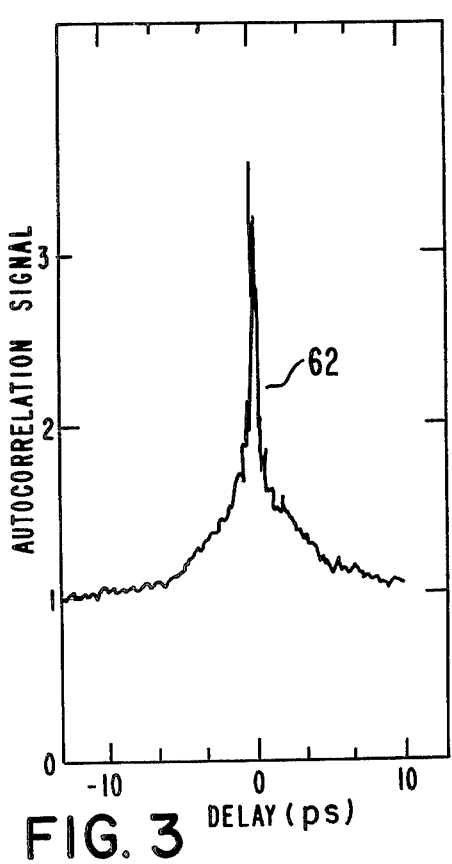
FIG. 3 is a typical autocorrelation trace from the modulated dye laser of FIG. 1.

A typical autocorrelation trace obtained from an experimental amplitude modulated dye laser constructed in accordance with the present invention as illustrated and described herein, and for an intermediate value of N and at a low pump power, is shown in FIG. 3 by the trace 62. The 3:1 contrast ratio shown by the trace indicates that good mode locking is achieved by the arrangement of FIG. 1. From the 0.7 ps FWHM of the autocorrelation trace, a pulse width of 0.35 ps or 0.45 ps can be calculated, assuming, respectively, a single-sided exponential or a sech-squared dependence for the pulse shape. With an output coupler 28 having a 12% transmittance, and with 400 mW of pump power, an average output power of 40 mW has been obtained from the arrangement of FIG. 1. The spectral bandwidth for this configuration was measured as 9 Å. This leads, in the case of a single sided exponential pulse shape, to a pulse-width-bandwidth product $\tau_p \Delta v = 0.3$, which shows that these pulses are very nearly transform-limited.

In the aforesaid experimental device, it was found that the laser could be tuned from about 580 nm to about 610 nm while maintaining an equivalent pulse width. However, the cavity length had to be readjusted after any change in the mechanical orientation of the tuning/EOM crystal 42. It was also found that frequent readjustments of the cavity length were necessary to compensate for slow temperature drifts in the stainless steel table top on which the laser was mounted. Misadjustments in cavity length of less than 0.5 μm were enough to disturb the good mode locking and to widen considerably the base of the autocorrelation trace, giving a shoulder at the half intensity points. However, no other optical element was required in the cavity for operation at low power.

Even though travelling wave operation could easily be achieved at higher average pump power than that of the above-described experimental configuration, only incomplete mode locking could obtained in that arrangement; accordingly, a pellicle beam splitter (7μ thick) with a 20 percent reflective coating was added into the cavity, as illustrated in FIG. 4 at 64, the remaining elements of this configuration remaining unchanged from that of FIG. 1, and being similarly numbered.

Pellicle 64 performs a number of functions in the dye laser, including providing a higher effective output coupling from the cavity, a narrowing of the bandwidth, an increase in the loss differential for the counterpropagating pulses when the electrooptic modulator operates as a birefringent tuner, and improved mode locking at higher pump levels. The pulses produced with the use of the pellicle are highly stable, but have a slightly longer duration than was obtained without the pellicle.

Figure 5:
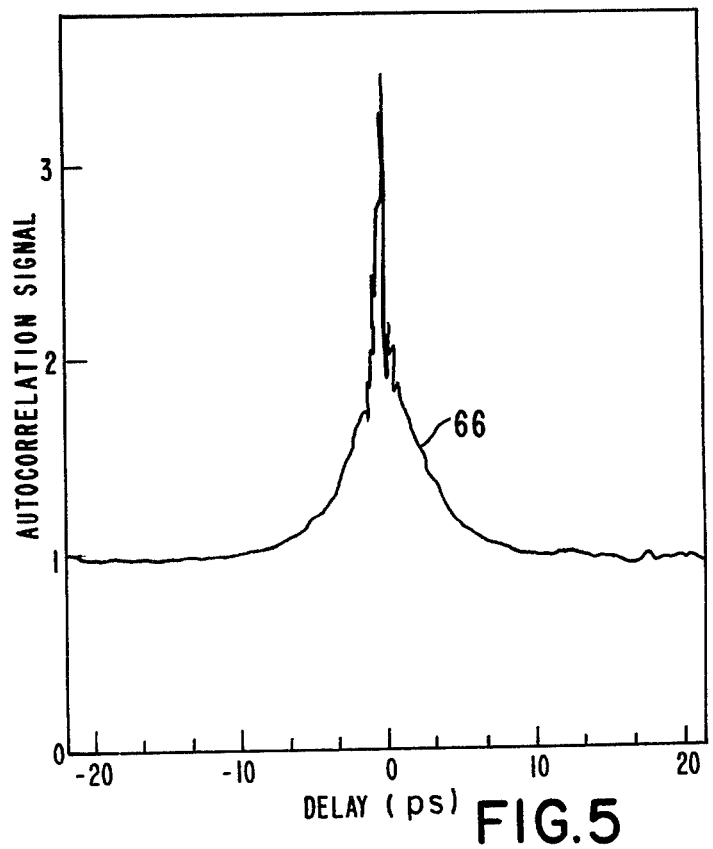
FIG. 5 is a typical autocorrelation trace obtained from the modulated ring dye laser of FIG. 4.

The autocorrelation trace 66 illustrated in FIG. 5 was obtained from a laser configuration such as that illustrated in FIG. 4, with an average pump power of 1 W. This trace gives a calculated pulse width of 0.45 pS for a single sided exponential. This configuration also produced a total average power of 120 mW, with 40 mW being obtained through the 12 percent output coupler 28 as indicated at line 40, and with 80 mW being reflected from the beam splitter 64, as indicated at line 68. If a 30 percent coupler were to be used at mirror 28 instead of the present combination, peak power in excess of 3 kW would be obtained. In the regime of FIG. 4, the laser was found to be highly stable, and cavity detunings of less than 1 μm did not significantly disturb the subpicosecond pulses.

At higher values of N, longer pulses were obtained, due to the narrower spectral bandwidth allowed; for example, at $N=7$, an autocorrelation FWHM of 1.5 ps was obtained.

Thus, there has been disclosed a new apparatus and method for achieving travelling wave operation in a continuous wave, synchronously pumped, ring laser, wherein subpicosecond pulses have been generated over a wide spectral region of the available tuning range of the laser. The travelling wave mode of the laser configuration described herein provides for shorter and more stable pulses than when both directions are simultaneously lasing. The described technique provides an optical gate in the laser cavity which is time synchronized with the counterpropagating pulses to attenuate one pulse but not the other, whereby time synchronization leads to mode locking. The optical gate is an amplitude modulating crystal which has a low loss and which operates at the same frequency (period) as the laser pump, and in a selectable phase relationship therewith.

Although the invention has been described in terms of a preferred embodiment using dye lasers, it will be understood that the laser may be any synchronously pumped mode-locked laser, and accordingly variations may be made by those of skill in the art without departing from the true spirit and scope of the invention as set forth in the following claims:

What is claimed is:

1. Apparatus for obtaining subpicosecond optical pulses from a laser, comprising:
    a synchronously pumped laser located within a ring cavity and generating two counterpropagating optical pulses within said cavity;
    an amplitude modulator assymetrically located in the optical path of said pulses within said ring laser; and
    means for time varying said amplitude modulator in time synchronization with the generation of said two counterpropagating optical pulses to block a selected one of said two optical pulses and to thereby achieve mode locking, whereby short output pulses having a time duration of less than about 1 picosecond are obtained.

2. The apparatus of claim 1, wherein said amplitude modulator is tunable so that the wavelength of said output optical pulses is variable over a wide spectral region of the tuning range of said laser.

3. The apparatus of claim 2, wherein said amplitude modulator is an electrooptic modulator.

4. The apparatus of claim 2, wherein said means for time varying said amplitude modulator comprises a source of high frequency electrical signals having a period equal to the period of said optical pulses, and phase shift means for adjusting the phase of said electric signals with respect to said optical pulses.

5. The apparatus of claim 4, wherein said amplitude modulator is located at a distance of approximately one-fourth the total cavity length away from said laser, whereby maximum discrimination between said two counterpropagating pulses is obtained.

6. The apparatus of claim 5, wherein said amplitude modulator is a voltage controlled KDP longitudinal electrooptic crystal.

7. The apparatus of claim 6, wherein said laser is pumped by a pumping laser, and wherein said pumping laser and said source of high frequency signals are driven by common oscillator means for synchronization of said pumping laser and said amplitude modulator.

8. The apparatus of claim 7, further including a beam splitter interposed in said cavity.

9. The method of producing a mode locked, unidirectional travelling wave in a tunable ring laser, comprising:
    pumping a laser in a ring cavity to produce two counterpropagating optical pulses within the cavity;
    locating an amplitude modulator within said ring cavity at a distance of one-fourth the total cavity length away from the laser;
    generating a radio frequency electrical control signal;
    applying said control signal to said amplitude modulator; and
    controlling the phase of said control signal with respect to the production of said optical pulses to time vary the amplitude modulator to block a selected one of said two counterpropagating optical pulses to provide a unidirectional travelling wave in said cavity, whereby said ring laser is mode locked to produce a very short output optical pulse in the range of less than 1 picosecond duration.

10. The method of claim 9, further including driving said laser and generating said radio frequency control signal from a common source, whereby said amplitude modulator is synchronized with the pumping period of said laser.

11. The method of producing a mode locked, unidirectional travelling wave in a ring laser for obtaining output pulses of short duration, comprising;
    synchronously pumping a laser in a ring cavity to produce two counterpropagating optical pulses within the cavity;
    assymetrically locating an amplitude modulator having a variable optical transmittance in the path of said counterpropagating optical pulses; and
    time varying the optical transmittance of said amplitude modulator in time synchronization with the generation of said two counterpropagating optical pulses to block a selected one of said two optical pulses.

12. The method of claim 11, further including tuning said amplitude modulator to vary the wavelength of the output pulses obtained from said ring laser over a wide spectral region of the tuning range of said laser.

13. The method of claim 11, wherein the step of varying the transmittance of said amplitude modulator comprises;
    generating a radio frequency control signal and supplying said control signal to said amplitude modulator.

14. The method of claim 11, wherein the step of varying the transmittance of said amplitude modulator comprises generating a control signal having a period equal to that of said optical pulses and controlling the phase of said control signal with respect to that of said optical pulses.

15. The method of claim 11, further including locating said amplitude modulator at a distance of approximately one-fourth the total cavity length away from said laser, to obtain maximum discrimination between said two counterpropagating pulses.

* * * * *